US012673659B2

(12) United States Patent
Yamada

(10) Patent No.: US 12,673,659 B2
(45) Date of Patent: *Jul. 7, 2026

(54) CONTROL DEVICE

(71) Applicant: TOYOTA JIDOSHA KABUSHIKI KAISHA, Toyota (JP)

(72) Inventor: Yoshihisa Yamada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

This patent is subject to a terminal disclaimer.

(21) Appl. No.: 18/644,338

(22) Filed: Apr. 24, 2024

(65) Prior Publication Data

US 2024/0270230 A1 Aug. 15, 2024

Related U.S. Application Data

(63) Continuation of application No. 17/489,009, filed on Sep. 29, 2021, now Pat. No. 12,005,882, which is a
(Continued)

(30) Foreign Application Priority Data

Aug. 30, 2018 (JP) ................................. 2018-161524

(51) Int. Cl.
*B60W 10/18* (2012.01)
*B60T 8/1755* (2006.01)
*B60W 10/20* (2006.01)

(52) U.S. Cl.
CPC ........... *B60W 10/18* (2013.01); *B60T 8/1755* (2013.01); *B60W 10/20* (2013.01)

(58) Field of Classification Search
CPC ................. B60W 10/18; B60W 10/20; B60W 2520/125; B60W 10/04; B60W 30/06;
(Continued)

(56) References Cited

U.S. PATENT DOCUMENTS 5,572,449 A 11/1996 Tang et al.
6,195,606 B1 2/2001 Barta et al.
(Continued)

FOREIGN PATENT DOCUMENTS

CA 2549654 A1 7/2005
DE 19838336 A1 3/2000
(Continued)

OTHER PUBLICATIONS

Apr. 27, 2021 Office Action issued in U.S. Appl. No. 16/444,372.
(Continued)

*Primary Examiner* — Mary Cheung
(74) *Attorney, Agent, or Firm* — Oliff PLC

(57) ABSTRACT

A control device for controlling a brake of a vehicle includes an arbitrating unit configured to receive motion requests for a plurality of actuators, which are used for controlling a motion of the vehicle, from a plurality of application requesting units related to driving support functions and to arbitrate the received motion requests, a command distributing unit configured to distribute commands to controllers for controlling the actuators based on an arbitration result obtained by the arbitrating unit, and a feedback controller configured to feed back a control record value indicating the motion of the vehicle, which is measured by using sensor units, to the application requesting units and to realize the motion of the vehicle requested by the application requesting units.

10 Claims, 2 Drawing Sheets

Related U.S. Application Data continuation of application No. 16/444,372, filed on Jun. 18, 2019, now Pat. No. 11,161,496.

(58) Field of Classification Search
CPC ...... B60W 30/09; B60W 30/12; B60W 30/14; B60W 2050/0006; B60W 2540/18; B60W 30/02; B60W 2050/009; B60W 2050/0091; B60W 2050/0094; B60W 2520/10; B60W 2520/105; B60W 2520/14; B60W 2520/28; B60W 2540/10; B60W 2540/12; B60W 50/045; B60W 2050/0095; B60W 50/16; B60W 10/00; B60T 8/1755; B60T 8/17; B60T 13/741; B60T 7/00; B60Y 2400/3032; B60Y 2300/02; G08G 1/168
See application file for complete search history.

(56) References Cited

U.S. PATENT DOCUMENTS

| | | | |
|---|---|---|---|
| 6,339,739 B1 | 1/2002 | Folke et al. | |
| 10,220,840 B2 * | 3/2019 | Choi ..................... | B60W 30/02 |
| 10,279,788 B2 | 5/2019 | Eckert | |
| 10,384,672 B1 | 8/2019 | Katzourakis et al. | |
| 11,161,496 B2 | 11/2021 | Yamada | |
| 2009/0048751 A1 | 2/2009 | Nakai et al. | |
| 2011/0015844 A1 | 1/2011 | Perkins et al. | |
| 2011/0066344 A1 | 3/2011 | Niwa et al. | |
| 2011/0098886 A1 | 4/2011 | Deng | |
| 2011/0166744 A1 | 7/2011 | Lu et al. | |
| 2012/0109410 A1 | 5/2012 | Hanzawa et al. | |
| 2012/0109414 A1 | 5/2012 | Kumabe et al. | |
| 2012/0109460 A1 | 5/2012 | Tokimasa et al. | |
| 2014/0067221 A1 | 3/2014 | Sundaram et al. | |
| 2014/0365228 A1 * | 12/2014 | Ng-Thow-Hing ...... | G06F 3/017 |
| | | | 704/275 |
| 2015/0353093 A1 | 12/2015 | Pallett | |
| 2017/0015323 A1 * | 1/2017 | Oguri .................... | B60W 10/08 |
| 2017/0151960 A1 | 6/2017 | Fujiki et al. | |
| 2018/0111607 A1 * | 4/2018 | Fujita .................... | B60T 8/1755 |
| 2018/0364712 A1 | 12/2018 | Debouk et al. | |
| 2019/0225217 A1 | 7/2019 | Tsukada | |
| 2019/0276026 A1 * | 9/2019 | Shimizu .......... | B60W 30/18072 |
| 2020/0369226 A1 | 11/2020 | Ferencz | |

FOREIGN PATENT DOCUMENTS

| | | |
|---|---|---|
| DE | 102010017647 A1 | 1/2011 |
| EA | 201391551 A1 | 5/2014 |
| JP | 2002-523276 A | 7/2002 |
| JP | 2009-040307 A | 2/2009 |
| JP | 2011-063098 A | 3/2011 |
| JP | 2012-096618 A | 5/2012 |
| JP | 2012-096619 A | 5/2012 |
| WO | 2012/173953 A1 | 12/2012 |

OTHER PUBLICATIONS

Aug. 16, 2021 Notice of Allowance issued in U.S. Appl. No. 16/444,372.

Jun. 8, 2023 Office Action issued in U.S. Appl. No. 17/489,009.

Oct. 2, 2023 Office Action issued in U.S. Appl. No. 17/489,009.

Feb. 27, 2024 Notice of Allowance issued in U.S. Appl. No. 17/489,009.

Jan. 9, 2024 Advisory Action issued in U.S. Appl. No. 17/489,009.

* cited by examiner

CONTROL DEVICE

INCORPORATION BY REFERENCE

This is a Continuation of application Ser. No. 17/489,009, filed Sep. 29, 2021, which is a Continuation of application Ser. No. 16/444,372, filed Jun. 18, 2019, which claims the benefit of Japanese Patent Application No. 2018-161524 filed on Aug. 30, 2018, each of which is incorporated herein by reference in its entirety.

BACKGROUND

1. Technical Field

The disclosure relates to a control device for controlling a brake of a vehicle.

2. Description of Related Art

Japanese Unexamined Patent Application Publication No. 2012-96619 (JP 2012-96619 A) discloses a vehicle lateral motion control system that controls the lateral motion of a vehicle by driving an actuator provided on each of a front steering unit, a rear steering unit and a brake. The system disclosed in JP 2012-96619 A acquires an availability that represents a controllable range of each actuator, calculates a feed-forward (F/F) request value for executing feed-forward control of each actuator and a feed-back (F/B) request value for executing feed-back control of each actuator using the acquired availability, and determines a mechanism to be controlled and a control amount ultimately generated for the mechanism based on the calculated F/F request value and the calculated F/B request value.

SUMMARY

Driving support systems, such as an automatic driving system, an automatic parking system and the like, are increasing. The driving support systems make requests with respect to actuators that control driving, braking and steering of a vehicle. As the number of types of driving support systems increases, the number of requests for each actuator also increases. Therefore, the handling of a plurality of requests becomes complicated in a control device (ECU) that controls each actuator.

The disclosure provides a control device capable of comprehensively managing requests transmitted from a plurality of application requesting units that realize driving support functions.

An aspect of the disclosure relates to a control device for controlling a brake of a vehicle, including: an arbitrating unit configured to receive motion requests for a plurality of actuators, which are used for controlling a motion of the vehicle from a plurality of application requesting units related to driving support functions and to arbitrate the received motion requests; a command distributing unit configured to distribute commands to controllers for controlling the actuators based on an arbitration result obtained by the arbitrating unit; and a feedback controller configured to feed back a control record value indicating the motion of the vehicle, which is measured by using sensor units, to the application requesting units and to realize the motion of the vehicle requested by the application requesting units.

In the control device according to the above aspect, the arbitrating unit may be configured to arbitrate each of information indicating a front-back motion of the vehicle included in the motion requests and information indicating a lateral motion of the vehicle.

In the control device according to the above aspect, the control device may further include a request generating unit. The request generation unit may be configured to output driving requests to the controllers for controlling the actuators based on the commands distributed by the command distributing unit.

In the control device according to the above aspect, the sensor units may include a plurality of wheel speed sensors provided on respective wheels; and outputs obtained by the wheel speed sensors may be directly input to the control device via a signal line.

In the control device according to the above aspect, the control device may further include a vehicle motion controller. The vehicle motion controller may be configured to preferentially drive the actuators to comprehensively control a driving stability of the vehicle.

With various aspects of the disclosure, it is possible to provide a control device capable of comprehensively managing requests transmitted from a plurality of application requesting units that realize driving support functions.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments

In embodiments of the disclosure, a vehicle control device (brake control ECU) for controlling a brake has a function of comprehensively managing requests sent from a plurality of application requesting units to a plurality of actuators and a function of feeding back a behavior of a vehicle with respect to the application requesting units. In the case where the requests are issued from the application requesting units with respect to the respective actuators at the same time, the brake control ECU arbitrates the requests to facilitate the process in a controller for controlling the respective actuators.

Configuration

Figure 1:
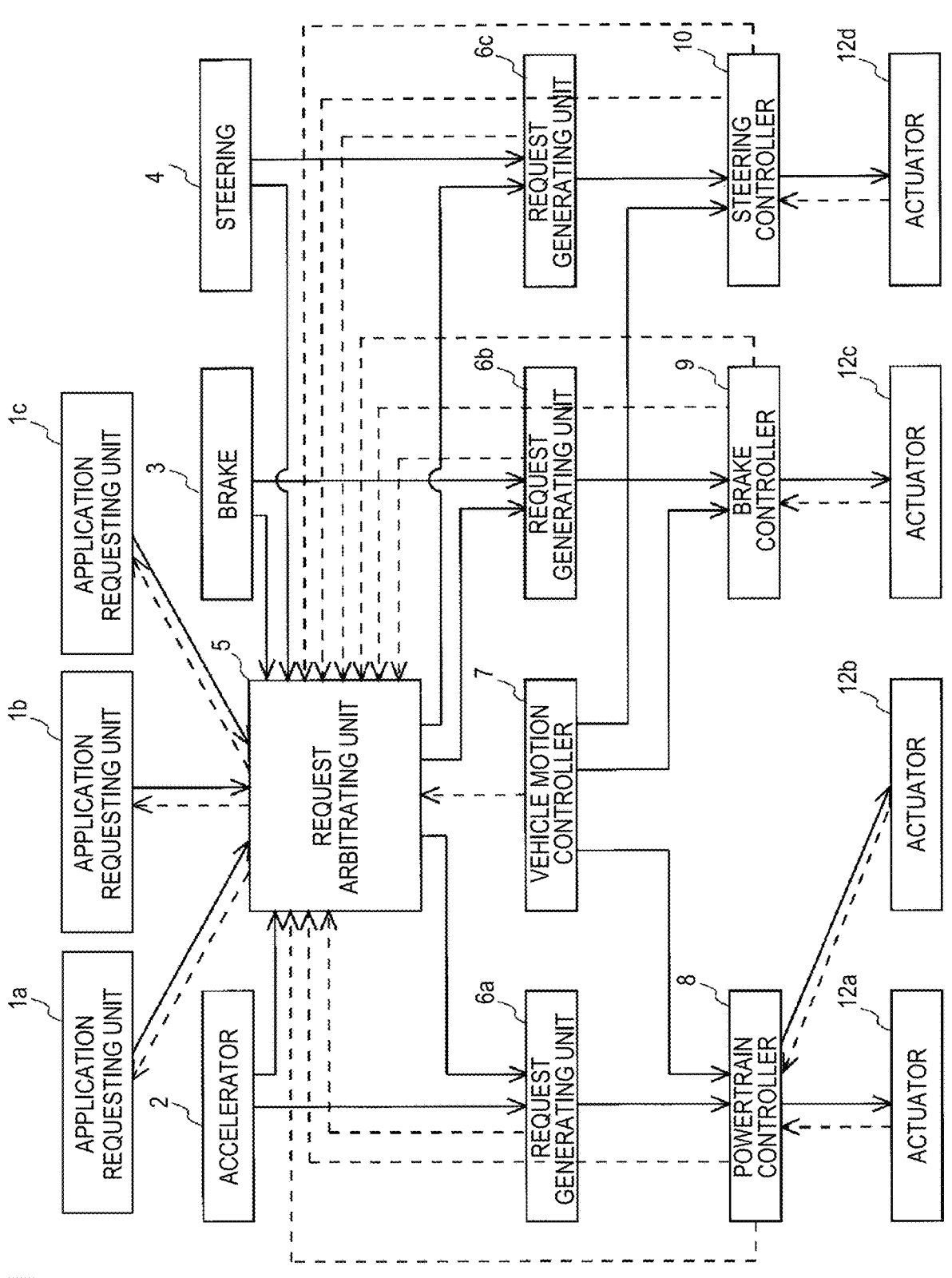
FIG. 1 is a functional block diagram showing a vehicle control system according to embodiments of the disclosure.
Figure 2:
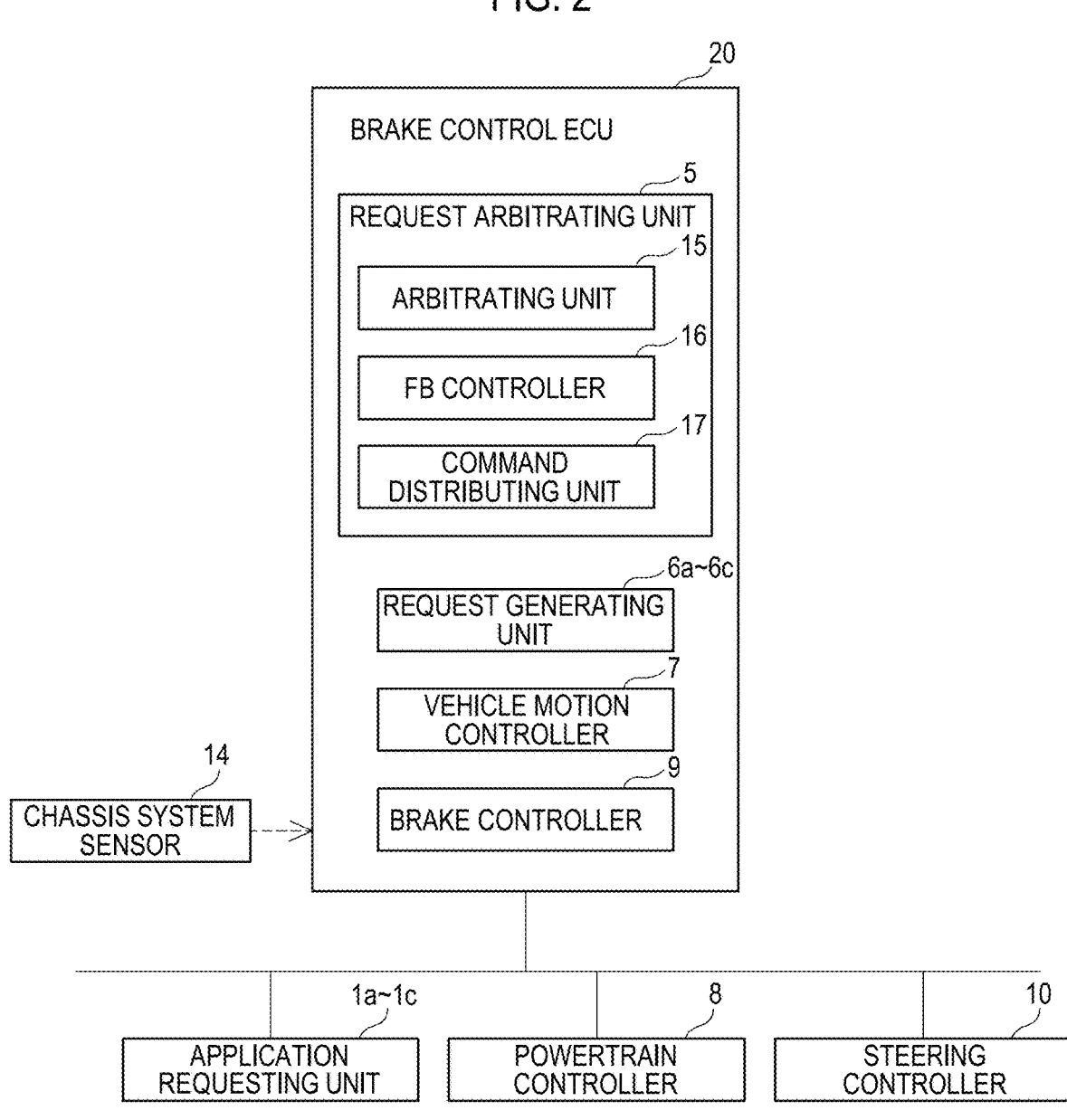
FIG. 2 is a block diagram showing a configuration of a brake control ECU according to embodiments of the disclosure.

FIG. 1 is a functional block diagram showing a vehicle control system according to embodiments of the disclosure, and FIG. 2 is a block diagram showing a configuration of a brake control ECU 20 according to embodiments of the disclosure.

The vehicle control system shown in FIG. 1 includes a plurality of application requesting units 1a to 1c, an accelerator 2, a brake 3, a steering 4, a request arbitrating unit 5, request generating units 6a to 6c, a vehicle motion controller 7, a powertrain controller 8, a brake controller 9, a steering controller 10, and actuators 12a to 12d.

The application requesting units 1a to 1c are applications (also referred to as advanced safety applications) for realizing vehicle driving support functions, such as automatic driving, automatic parking, adaptive cruise control, lane keeping assist, collision mitigation braking and the like. The application requesting units 1a to 1c output a request for controlling the motion of the vehicle to the actuators 12a to 12d based on each of the driving support functions. Typically, the application requesting units 1a to 1c are implemented with the execution of the respective applications by the ECU. In some cases, the application requesting units 1a to 1c may simultaneously execute the applications depending on the driving support function to be used. In FIG. 1, three application requesting units 1a to 1c are shown for the sake of convenience in description. However, the number of application requesting units for realizing the driving support functions is not limited to three. Two or less or four or more application requesting units may be mounted on the vehicle in some cases. The application requesting units 1a to 1c output request signals for operating the actuators 12a to 12d to the request arbitrating unit 5 to be described later.

The accelerator 2, the brake 3 and the steering 4 are input devices operated by a driver to control the motion of the vehicle. The request inputted by the driver operating the accelerator 2 (accelerator pedal) includes information that specifies the magnitude of a propulsion force or a braking force required by the driver and is notified to the request generating unit 6a and the request arbitrating unit 5. Furthermore, the request inputted by the driver operating the brake 3 (brake pedal) includes information that specifies the magnitude of a braking force required by the driver and is notified to the request generating unit 6b and the request arbitrating unit 5. Moreover, the request inputted by the driver operating the steering 4 (steering wheel) includes information that specifies the lateral motion amount or the turning amount of the vehicle required by the driver and is notified to the request generation unit 6c and the request arbitrating unit 5. The reason for notifying the requests based on the operations of the accelerator 2, the brake 3 and the steering 4 to the request arbitrating unit 5 is that the input requests can be notified to the application requesting units 1a to 1c via the request arbitrating unit 5.

The request arbitrating unit 5 receives the request signals that are output from the application requesting units 1a to 1c and arbitrates the received requests.

As shown in FIG. 2, the request arbitrating unit 5 includes an arbitrating unit 15, a feedback (FB) controller 16, and a command distributing unit 17.

The arbitrating unit 15 arbitrates the requests to be supplied from the application requesting units 1a to 1c to the actuators 12a to 12d. The arbitrating unit 15 performs arbitration for information indicating the front-back motion of the vehicle, which is included in the request signal received from the application requesting units 1a to 1c, and information indicating the lateral motion of the vehicle, which is included in the received data set. The information indicating the front-back motion of the vehicle received from the application requesting units 1a to 1c is, for example, acceleration, and the information indicating the lateral motion of the vehicle is, for example, acceleration or a steering angle. For example, the arbitrating unit 15 performs arbitration by selecting one request signal from the received request signals based on a predetermined selection criterion or setting an allowable control range based on the received request signals.

The FB controller 16 measures the motion of the vehicle based on an output value of a chassis system sensor 14 provided in a chassis. The chassis system sensor 14 includes plural kinds of sensors for measuring a state amount of a vehicle and an operation amount of an operation unit operated by a driver. Examples of the sensor for measuring a state amount of the vehicle include a wheel speed sensor provided in each wheel, an acceleration sensor for measuring acceleration of the vehicle in an anteroposterior direction and/or a left-right direction, a yaw rate sensor for measuring a yaw rate of the vehicle, and the like. Examples of the sensor for measuring the operation amount of the operation unit operated by the driver include a steering angle sensor for detecting a steering operation amount, a brake pedal sensor for detecting a depression amount of a brake pedal, an accelerator pedal sensor for detecting a depression amount of an accelerator pedal, and the like. Furthermore, the FB controller 16 acquires information indicating control record values and operation states of the actuators 12a to 12d, which are notified from the powertrain controller 8, the brake controller 9 and the steering controller 10, which will be described later. The FB controller 16 feeds back the various kinds of information thus acquired to the application requesting units 1a to 1c and also outputs the acquired various kinds of information to the command distributing unit 17 to be described later. Based on the various kinds of information fed back from the FB controller 16, the application requesting units 1a to 1c may monitor the execution state of a control process for providing the driving support functions and may change or stop the control process as necessary. The various kinds of information that are output from the FB controller 16 to the command distributing unit 17 are used when the command distributing unit 17 generates commands for the request generating units 6a to 6c to be described later, and are used for feedback control of the powertrain controller 8, the brake controller 9 and the steering controller 10 to bring the motion of the vehicle close to a target motion which is the arbitration result provided by the arbitrating unit 15.

Based on the arbitration result provided by the arbitrating unit 15, the command distributing unit 17 distributes commands to controllers that control the actuators 12a to 12d. In distributing the commands, the command distributing unit 17 refers to the various kinds of information that are output from the FB controller 16 and generates the commands to be supplied to the powertrain controller 8, the brake controller 9 and the steering controller 10 so that the motion of the vehicle is brought close to the target motion. The command distributing unit 17 outputs the distributed commands to the request generating units 6a to 6c described later. As the command distributing unit 17 distributes the commands based on the output of the FB controller 16, the powertrain controller 8, the brake controller 9 and the steering controller 10 are subjected to the feedback control based on the respective control record values.

The request generating unit 6a generates a request for the actuators 12a and 12b based on the command provided from the command distributing unit 17, and outputs the generated request to the powertrain controller 8. Similarly, based on the commands provided from the command distributing unit 17, the request generating units 6b and 6c generate requests for the actuators 12c and 12d, respectively, and output the generated requests to the brake controller 9 and the steering controller 10, respectively. There may be a case where the requests from the driver inputted by the operations of the accelerator 2, the brake 3 and the steering 4 and one or more requests from the application requesting units 1a to 1c are input to the request generating units 6a to 6c at the same time. For example, it may be considered a scene in which the driver decelerates or stops the vehicle by operating the brake 3 with the intention of avoiding a danger during automatic driving or during automatic parking, or a scene in which the vehicle is laterally moved or turned by operating the steering 4 with the intention of avoiding a driver danger during control by a lane keeping assist. Therefore, when the request from the driver and one or more requests from the application requesting units 1a to 1c are input at the same time, each of the request generating units 6a to 6c select one of the requests based on selection criteria prepared in advance. The request generating units 6a, 6b and 6c issues drive instructions to the powertrain controller 8, the brake controller 9 and the steering controller 10, respectively, based on the respective requests selected by arbitration. In addition, each of the request generating units 6a, 6b and 6c selects either the request from the driver or one or more requests from the application requesting units 1a to 1c, and notifies the selected result to the request arbitrating unit 5.

The vehicle motion controller 7 comprehensively controls the driving stability of the vehicle by controlling the actuators 12a to 12d via the powertrain controller 8, the brake controller 9 and the steering controller 10. Examples of the control performed by the vehicle motion controller 7 may include control for suppressing the idling of tires and the sideslip of the vehicle by controlling the output of a powertrain and the braking force, control for preventing the locking of tires at sudden braking, control for generating a strong braking force by detecting emergency braking from the depression amount and the depression speed of a brake, and the like. The control for maintaining the driving stability performed by the vehicle motion controller 7 needs to be performed as soon as the driving stability of the vehicle is impaired. Therefore, the control for maintaining the driving stability is executed independently of the driving instruction provided from the driver and the driving instruction provided from the application requesting units 1a to 1c. When issuing a driving instruction to any one of the powertrain controller 8, the brake controller 9 and the steering controller 10, the vehicle motion controller 7 notifies the request arbitrating unit 5 of the information related to the control amount (availability) currently realizable by the actuators 12a to 12d. The information on the availability is notified from the request arbitrating unit 5 to the application requesting units 1a to 1c. During the operation of the vehicle motion controller 7, the actuators 12a to 12d may not be able to realize the request requested by the application requesting units 1a to 1c in some cases. As the vehicle motion controller 7 notifies the application requesting units 1a to 1c of the information on the availability via the request arbitrating unit 5, it is possible for the application requesting units 1a to 1c to change or adjust the control process under execution.

The powertrain controller 8 controls the operations of the actuators 12a and 12b that constitute a powertrain (sometimes referred to as a drive train), thereby generating the propulsion force or the braking force requested from the request generating unit 6a or the vehicle motion controller 7. The powertrain controller 8 is realized by, for example, any one of an engine control ECU, a hybrid control ECU, a transmission ECU and the like, or a combination thereof. In FIG. 1, for the sake of convenience in description, two actuators 12a and 12b are shown as control targets of the powertrain controller 8. However, the number of actuators controlled by the powertrain controller 8 may be one or three or more depending on the configuration of the powertrain of the vehicle. Examples of the actuators 12a and 12b constituting the powertrain include an engine, a driving motor, a clutch, a torque converter, a transmission, a mechanism for distributing torque to the front wheel and the rear wheel in a four-wheel-drive vehicle, and the like.

The brake controller 9 controls the operation of brake actuators provided in the respective wheels, thereby generating the braking force requested by the request generating unit 6b or the vehicle motion controller 7. The brake controller 9 is directly connected to the chassis system sensor 14 via a signal line. The output value of a wheel speed sensor of each wheel included in the chassis system sensor 14 is input to the brake controller 9 via the signal line.

The steering controller 10 controls the rotational force of a motor of an electric power steering (EPS) unit, thereby controlling the orientation of the tire connected via a rack & pinion mechanism. The steering controller 10 is realized by, for example, a power steering control ECU.

As described above, the request from a corresponding one of the request generating units 6a to 6c and the request from the vehicle motion controller 7 may be simultaneously input to each of the powertrain controller 8, the brake controller 9 and the steering controller 10 in some cases. For example, when the powertrain controller 8 is generating the requested propulsion force based on the operation of the accelerator 2 by the driver, if the sideslip of the wheels is detected, the vehicle motion controller 7 controls the braking force generated in the brake actuator of each wheel and the output of the engine or the driving motor in order to suppress the sideslip of the wheel. In this case, in order to prioritize the sideslip suppression performed by the vehicle motion controller 7, the powertrain controller 8, the brake controller 9 and the steering controller 10 control the respective actuators 12a to 12d by prioritizing the request from the vehicle motion controller 7.

The powertrain controller 8, the brake controller 9 and the steering controller 10 drive the actuators 12a to 12d based on the requests from the request generating units 6a to 6c, respectively. The powertrain controller 8, the brake controller 9 and the steering controller 10 acquire information on the operation states of the respective actuators 12a to 12d based on the response signals from the respective actuators 12a to 12d or the measured values obtained by the respective sensors. Examples of the information on the operation states of the actuators 12a to 12d include information indicating the availability of the respective actuators 12a to 12d (information indicating whether the respective actuators 12a to 12d can react as expected or not), information indicating monitor values of the outputs of the respective actuators 12a to 12d such as a propulsion force, a braking force, a yaw rate, a steering angle and the like which are being realized by the respective actuators 12a to 12d, information specific to the respective actuators 12a to 12d such as whether or not the temperature of a brake pad is shifting in an overheating direction, and the like. The powertrain controller 8, the brake controller 9 and the steering controller 10 notify the request arbitrating unit 5 of the information indicating the monitor values of the outputs of the respective actuators 12a to 12d to be controlled and the information specific to the respective actuators 12a to 12d. When the powertrain controller 8, the brake controller 9 and the steering controller 10 detect that the respective actuators 12a to 12d to be controlled are faulty, the powertrain controller 8, the brake controller 9 and the steering controller 10 notify the request arbitrating unit 5 of the information indicating the availability of the respective actuators 12a to 12d to be controlled. The information related to the operation states of the respective actuators 12a to 12d is further notified from the request arbitrating unit 5 to the respective application requesting units 1a to 1c. The application requesting units 1a to 1c may change or adjust the control process under execution based on the notified operation states of the respective actuators 12a to 12d.

As shown in FIG. 2, the brake control ECU 20, which is a control device for controlling a brake, includes the request arbitrating unit 5, the request generating units 6a to 6c and the vehicle motion controller 7, which are shown in FIG. 1, in addition to the brake controller 9. The brake control ECU 20, the application requesting units 1a to 1c, the powertrain controller 8 and the steering controller 10 may make communication with each other through ECU communication.

<Effects>

The configuration of the brake control ECU 20 according to the present embodiments has the following advantages.

First, the brake control ECU 20 includes the request arbitrating unit 5 such that the brake control ECU 20 can manage the requests provided from the application requesting units 1a to 1c in an integrated manner and distribute the control amounts (commands) necessary for realizing the requested vehicle motion to the powertrain controller 8, the brake controller 9 and the steering controller 10. As described above, the configuration for managing the requests provided from the application requesting units 1a to 1c in an integrated manner using the request arbitrating unit 5 has an advantage that, even when an additional application requesting unit for realizing another driving support function is added, there is no need to change the control process of the powertrain controller 8, the brake controller 9 and the steering controller 10. The brake control ECU 20 may be mounted on any type of vehicle. Therefore, by mounting the request arbitrating unit 5 and the request generating units 6a to 6c on the brake control ECU 20, it is possible in any type of vehicle to manage the requests from the application requesting units 1a to 1c for realizing the driving support functions in an integrated manner. In the case where the request arbitrating unit 5 and the request generating units 6a to 6c are provided in the existing brake control ECU 20, as compared with a case where a control device (ECU) for managing the requests from the application requesting units 1a to 1c in an integrated manner is newly provided, it is possible to suppress an increase in the cost required for an ECU and a communication system and an increase in the types of ECU and communication system.

As the ECUs mounted on the vehicle regardless of the type of vehicle, there are also an ECU (the powertrain controller 8) for controlling a powertrain and an ECU (the steering controller 10) for controlling a steering. However, when the communication between the ECUs is interrupted, the ECU for controlling the steering cannot generate a braking force by itself. In addition, although the powertrain control ECU can generate a braking force by a pumping loss, there is a limit to the braking force that can be generated by the powertrain control ECU, because it is impossible to use a friction brake. Therefore, from the viewpoint of leaving a sufficient braking function at the time of failure, it is most preferable to provide the request arbitrating unit 5 and the request generating units 6a to 6c in the brake control ECU 20.

In addition, if a failure occurs in a portion of a complex control system, the control to be performed to ensure safety varies depending on a speed of the vehicle. For example, if the vehicle speed at the time of occurrence of a failure is 3 km/h or less, it is preferable to immediately apply a brake to the vehicle and stop the vehicle, whereas if the vehicle speed at the time of occurrence of a failure is 50 km/h, it is required to gradually decelerate the vehicle and then stop the vehicle. In order to reliably detect the vehicle speed, a wheel speed sensor is indispensable. The measured value of the wheel speed sensor is directly input to the brake control ECU 20 via the signal line. Therefore, from the viewpoint of performing control for transiting the state of the vehicle to a safe state depending on the vehicle speed, it is desirable to provide the request arbitrating unit 5 and the request generating units 6a to 6c in the brake control ECU 20.

The brake control ECU 20 according to the present embodiments is provided with the FB controller 11 that measures a control record value of a vehicle for use in feedback control. As compared with a case where each control function of the driving support system is provided with a controller that feeds back the control record value of the longitudinal (front-rear) motion of the vehicle and a controller that feeds back the control record value of the lateral direction (left-right) motion of the vehicle, there is an advantage that the number of controllers can be minimized. Furthermore, by providing the FB controller 11 in the brake control ECU 20, it is possible to reduce the communication load by suppressing the communication traffic when feeding back the control record value measured by the FB controller 11 to the application requesting units 1a to 1c.

In order to continue the control process for realizing the driving support functions, the application requesting units 1a to 1c require information on the state of execution of the requests instructed to the actuators 12a to 12d and information on the soundness of the actuators 12a to 12d. The request arbitrating unit 5 summarizes the information on the operation states of the actuators 12a to 12d acquired by the powertrain controller 8, the brake controller 9 and the steering controller 10 and notifies the application requesting units 1a to 1c of the summarized information. It is therefore possible to reduce the communication load required for notifying the application requesting units 1a to 1c of the information on the operation states of the actuators 12a to 12d.

Furthermore, as in the present embodiments, when the vehicle motion controller 7 for autonomously controlling the motion stability of the vehicle is mounted on the vehicle, it is preferable to mount the vehicle motion controller 7 on the brake control ECU 20. In order to preferentially use the actuators 12a to 12d while the vehicle motion controller 7 is executing control, it is necessary to notify the application requesting units 1a to 1c of the information on the availability of the actuators 12a to 12d. In the present embodiments, the vehicle motion controller 7 can notify information to the request arbitrating unit 5 provided in the same brake control ECU 20 with a minimum delay. It is therefore possible for the request arbitrating unit 5 to manage the information to be notified to the application requesting units 1a to 1c in an integrated manner.

The disclosure is capable of enhancing the availability of a brake control device installed in a vehicle.

What is claimed is:

1. A brake electronic control unit ("ECU") for controlling a brake actuator of a vehicle, wherein the brake ECU is configured to:

control the brake actuator;

receive a plurality of first requests respectively from a plurality of driver assistance applications external to the brake ECU, the plurality of first requests being requests for controlling a motion of the vehicle such that each of the driver assistance applications realizes a respective driving support function;

arbitrate the plurality of first requests;

calculate a second request based on a result of the arbitration, the second request being a different physical quantity from the first requests; and distribute the second request to one or more actuator systems.

2. The brake ECU according to claim 1, wherein the brake ECU is a component of a control device for controlling the brake actuator of the vehicle.

3. The brake ECU according to claim 1, wherein the brake ECU is a component of a system comprising:

the one or more actuator systems including the brake actuator of the vehicle; and the brake ECU.

4. The brake ECU according to claim 1, wherein the brake ECU is a component of a vehicle comprising:

the brake actuator; and the brake ECU.

5. A brake electronic control unit ("ECU") for controlling a brake actuator of a vehicle, wherein the brake ECU is configured to:

control the brake actuator;

receive a plurality of kinematic plans respectively from a plurality of driver assistance applications external to the brake ECU, the plurality of kinematic plans being plans for controlling a motion of the vehicle such that each of the driver assistance applications realizes a respective driving support function;

arbitrate the plurality of kinematic plans;

calculate a motion request based on a result of the arbitration, the motion request being a different physical quantity from the kinematic plans; and distribute the motion request to one or more actuator systems.

6. The brake ECU according to claim 5, wherein the brake ECU is a component of a control device for controlling the brake actuator of the vehicle.

7. The brake ECU according to claim 5, wherein the brake ECU is a component of a system comprising:

the one or more actuator systems including the brake actuator of the vehicle; and the brake ECU.

8. The brake ECU according to claim 5, wherein the brake ECU is a component of a vehicle comprising:

the brake actuator; and the brake ECU.

9. A control method performed by a brake electronic control unit ("ECU") for controlling a brake actuator of a vehicle, the method comprising controlling the brake actuator;

receiving a plurality of first requests respectively from a plurality of driver assistance applications external to the brake ECU, the plurality of first requests being requests for controlling a motion of the vehicle such that each of the driver assistance applications realizes a respective driving support function;

arbitrating the plurality of first requests;

calculating a second request based on a result of the arbitration, the second request being a different physical quantity from the first requests; and distributing the second request to one or more actuator systems.

10. A control method performed by a brake electronic control unit ("ECU") for controlling a brake actuator of a vehicle, the method comprising controlling the brake actuator;

receiving a plurality of kinematic plans respectively from a plurality of driver assistance applications external to the brake ECU, the plurality of kinematic plans being plans for controlling a motion of the vehicle such that each of the driver assistance applications realizes a respective driving support function;

arbitrating the plurality of kinematic plans;

calculating a motion request based on a result of the arbitration, the motion request being a different physical quantity from the kinematic plans; and distribute the motion request to one or more actuator systems.

\* \* \* \* \*